UNITED STATES PATENT OFFICE.

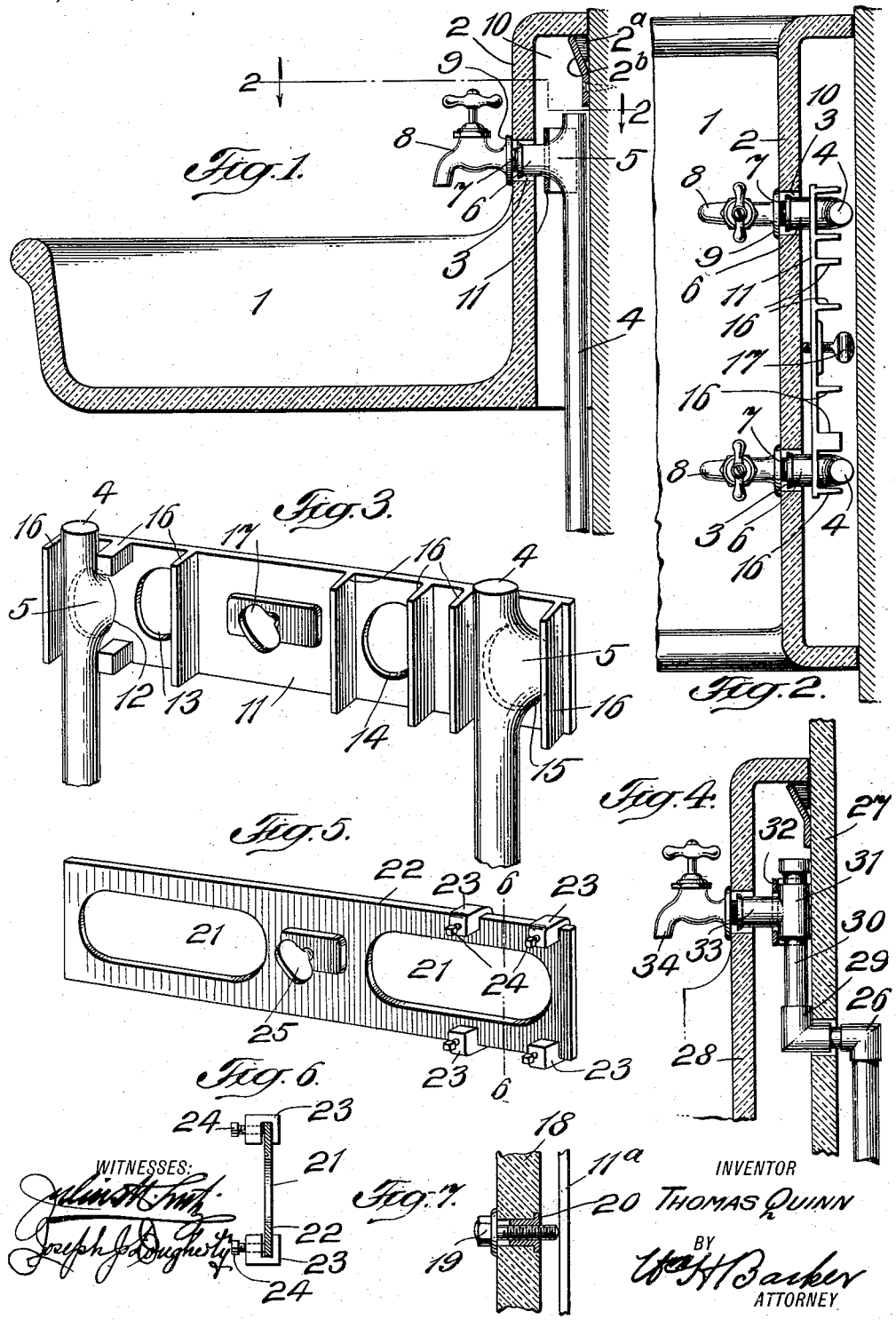

THOMAS QUINN, OF BROOKLYN, NEW YORK, ASSIGNOR TO HENRY W. TITUS, OF NEW YORK, N. Y.

ADJUSTABLE FAUCET-HOLDER.

1,202,222.  Specification of Letters Patent.  Patented Oct. 24, 1916.

Application filed March 3, 1916. Serial No. 81,857.

*To all whom it may concern:*

Be it known that I, THOMAS QUINN, a citizen of the United States, and a resident of Brooklyn, in the county of Kings and State of New York, have invented certain new and useful Improvements in Adjustable Faucet-Holders, of which the following is a full, clear, and exact description, whereby anyone skilled in the art may make and use the same.

The invention relates to a device for adjusting and holding faucets with reference to the sink, wall or other device or support through which the faucets project. The arrangement is such that a practically universal adjustment may be secured to aid the artisan in making his connections under any given system, whether it be one of lead pipes or iron pipes.

The object of the invention is to provide a clamping device for holding the faucet in close, clamped relation to the sink-backing or riser or the wall through which the piping projects to the faucet.

A further object is to obviate the necessity for adjustable collars on faucets.

It is a further object to provide a device which will prevent turning off or loosening of the wipe-joints or connections to which the faucet is applied, and to thus give greater life and security to the various connections.

A still further object is to provide a simple, inexpensive and universally adaptable device for clamping and holding faucets and connecting pipes in proper relation with reference to the wall, sink or the like through which connections are to be made.

Referring to the drawings: Figure 1 is a sectional view illustrating the application of the device to a single piece porcelain sink. Fig. 2 is a horizontal section on the line 2—2 of Fig. 1. Fig. 3 is a perspective view of the rear of the adjusting and clamping bracket. Fig. 4 is a sectional view illustrating the application of the device in conjunction with the piping passing through a wainscoting, tile or marble backing. Fig. 5 is a perspective view of a modified form of device illustrated in Fig. 3. Fig. 6 is a sectional view on the line 6—6 of Fig. 5. Fig. 7 is a fragmentary view illustrating a means of operating the clamp from the face of the sink or like part.

Ordinarily, in setting up sinks, basins or the like, particularly those of the porcelain type, it has been necessary to wedge or plug the piping, connected with the nipple to which the faucet is screwed, in order to take up lost movement between the faucet and the piping of the sink or wall through which the piping passes to the faucet. It has been a common practice to use lead piping and iron piping with right angle nipples or thimbles connecting with the main line of piping and serving as a means for connecting the faucets. Ordinarily, the faucets are screwed into the nipples or thimbles whether the latter are used in conjunction with iron piping or are connected with a lead piping through a wipe-joint. In either case, the main line pipes are arranged at the rear of the sink-backing or wainscoting of the wall, and in order to have the faucet seated firmly against the sink or wall, it has required considerable labor to adjust the several parts, either by most careful fitting or by wedging or plugging the piping at the rear of the supporting wall or riser. Where flanged faucets were employed, a tight fitting was particularly difficult to secure and where a movable collar was used for a finish about the faucet, additional expense and unusual care was required in making the joints and fittings aline and hold without lost movement. Furthermore, in renewing or changing faucets, the wipe-joints (as in the case of lead fittings), or the elbow or T-connections in the event of iron piping have been subject to strains and distrubance during the screwing and unscrewing of the faucets to their nipples. This has been a cause of great inconvenience to the artisan resulting in leakage about the joints. It is obvious that the screwing of the faucet to the nipple places a strain upon the pipe and its connections. These objections are entirely overcome in the invention herein defined.

Referring to the drawings, the numeral 1, denotes a sink or basin of the porcelain or iron type having a backing or riser 2, provided with suitable perforations 3, through which the connections for the faucet project. As illustrated in Figs. 1 to 3, the riser or supply pipe 4, is of lead and has a wipe-joint 5, terminating in a thimble or nipple 6, to which the threaded shank 7, of the faucet 8, is secured. As illustrated, the faucet has an integral flange 9, which serves as an abutment and as a finish about the opening 3, of the sink-backing. In the rear of the backing 2, where there is an ample space as at 10, there is arranged a locking plate 11. This plate, as illustrated in Figs. 1 to 3, has perforations 12, 13, 14, 15 of a sufficient size to receive the fittings to which the faucets are to be screwed. On either side of the various perforations, there are abutments 16, which extend rearwardly a sufficient distance from the face of the plate 11, to provide channels within which the risers 4, may rest with the elbows, nipples or similar connections projecting through the perforations of the plate. These abutments prevent undue twisting of the risers and appurtenant parts as the faucet is screwed into or out of the thimble or nipple. They prevent distortion of the wipe-joints in the case of lead pipes or the fittings ordinarily used in conjunction with iron pipes.

The plate 11, about its perforation, comes in contact with the solder of the wipe-joints or against the fittings of the iron pipe and prevents cutting or abrasion of the main riser or pipe line.

It will be observed that the spacing of the perforations of the plate 11, are such that practically any combination can be secured for the standard types of faucet openings which are generally employed in the sinks. These openings are ordinarily spaced either 5½, 8 or 10 inches between centers, and, of course, the perforations are ample in diameter to allow for sufficient adjustment in conjunction with the thimbles or nipples and the faucet openings.

Ordinarily, the sinks of the type referred to are provided with lugs 2ª, which may be dropped into bracket openings 2ᵇ. The latter are formed in a suitable bracket which is applied to the wall or support, and the interlocking arrangements provide for supporting the weight of the sink at the rear end with the backing in close juxtaposition to the wall or like support. Of course, the sinks and the like are usually provided with standards, brackets or legs for giving a perfect support.

In order to give the necessary adjustment between the plate 11, and the piping, and between the piping, the sink or support and the faucet, a clamping screw 17, is employed which, as illustrated in Fig. 3, projects through the plate 11, and may be screwed against the backing 2, of the sink, wall or wainscoting through which the piping extends to the faucets. It is quite obvious that by turning up the screw 17, the faucet flange 9, will be drawn against the face of the sink or wall to which it is applied, and the piping with its connections will be forced backward giving a firm, tight connection of the piping with reference to the faucets. All lost motion can be taken up and inaccuracies of fit may be overcome.

Of course, the faucet may be adjusted, by the degree to which it is screwed into the thimble or nipple 6, within certain latitudes. This adjustment, in conjunction with the adjusting screw 17, permits a very ready and accurate adjustment of all parts.

In lieu of using the set screw 17, on the rear of the plate, it is indicated in Fig. 3, that the adjusting screw may be carried through the face of the wall or riser through which the faucets project, as illustrated in Fig. 7. In such case, the plate 11ª, would be forced away from the backing 18, by a suitable screw 19, either screwed directly through the backing or preferably through a threaded socket member 20. In this case the adjustment or tightening of the parts may be effected from the face of the sink-riser, wall or the like. In an ordinary case of application, when the joints have been formed and the parts are ready for final assembly, the sink is released from its holding clips 2ª, 2ᵇ, the faucets are screwed into place and the binding screw 17, is set up. The parts are then firmly in place and the sink is hung upon its brackets.

In Fig. 5, there is illustrated a slightly modified form of device in which the openings for the nipples or thimbles consist of elongated perforations 21, formed through the plate 22. In order to provide abutments for preventing twisting of the risers, clamp-bars 23, are employed. These fit over the edges of the plate 22, and may be adjustable thereon and set up and locked in definite position by binding screws 24. In this form of device, any adjustment may be secured with reference to the connections, and the abutments 23, may be adjusted to any size of piping. The plate 22, serves as a clamp with reference to the pipes and faucets by setting up the clamping screw 25. Of course, it is obvious that a clamping screw such as illustrated in Fig. 7 might be equally well applied.

In Fig. 4, there is an illustration of the use of iron pipes, leads and nipples in conjunction with a wainscoting or wall, all of the piping being hidden behind the sink. In this case, the riser 26, extends upwardly behind the wainscoting or wall 27, and projects through said wall behind the backing 28, of the sink. An elbow 29 connects, through a short riser 30, with a fitting 31, which in turn rests against an adjusting plate 32, and has a nipple 33, into which the faucet 34, may be screwed. This latter arrangement is not a modification of a clamping device and adjustment but indicates the possibilities of using the clamping and adjusting device with any form of piping.

The device is simple, inexpensive and overcomes many objections heretofore inherent in making plumbing connections. It provides a simple form of clamp and adjustment which, not only takes up all slack and lost motion, but provides against distortion of the connections and consequent leakage. Of course, it is obvious that the device might be arranged in various detail forms. The main thought is to provide an adjustment which can be readily adjusted to effect a complete adjustment of the interconnected parts and prevent disarrangement and breakage of said parts.

While there is shown herein a set screw for forcing the adjusting plate away from the backing through which the faucet projects, it is obvious that an equivalent expanding device might be employed so long as such device is of an adjustable character, which will permit forcing the adjusting plate against the connections and hold a faucet clamped against the sink-riser or other support through which the connections pass.

What I claim as my invention and desire to secure by Letters Patent is:

1. An adjustable faucet holder consisting of an adjustable member adapted to engage the faucet connections, and adjusting devices for forcing said member and the connections in one direction away from the faucets and the member through which said faucets may project.

2. An adjustable faucet holder consisting of an adjustable member adapted to engage the faucet connections, and adjusting devices for forcing said member and the connections in one direction away from the faucets and the member through which said faucets may project, and means for holding one of said members against rotation.

3. An adjustable faucet holder consisting of an adjustable member adapted to engage the faucet connections, adjusting devices for forcing said member and the connections in one direction away from the faucets and the member through which said faucets may project, and means upon the adjusting member for preventing relative rotation of the faucet connections and the faucet.

4. In combination with a sink-riser or backing having perforations, faucet connections projecting into said perforations, faucets adapted to be screwed into said connections, an adjusting member adapted to bear against the faucet connections, and an adjusting device for inducing a forced pressure between the connections, the faucets and the backing through which the connections extend.

5. In combination with a sink-riser or backing having perforations, faucet connections projecting into said perforations, faucets adapted to be screwed into said connections, an adjusting member adapted to bear against the faucet connections, an adjusting device for inducing a forced pressure between the connections, the faucets and the backing through which the connections extend, and means for preventing relative rotation of the connections and backing.

6. In combination with a sink-riser or backing having perforations through which faucet connections extend, faucets adapted to be screwed into said connections and adapted to bear against the backing, a perforated plate adjustable with reference to the connections and bearing there against, and means for forcing said plate away from the backing.

7. In combination with a sink-riser or backing having perforations through which faucet connections extend, faucets adapted to be screwed into said connections and adapted to bear against the backing, a perforated plate adjustable with reference to the connections and bearing there against, means for forcing said plate away from the backing, and means for holding the connections against relative rotation with reference to the backing.

8. An adjusting device for faucets consisting of a plate, an adjusting device for moving said plate, and abutments upon said plate for engaging the connections whereby relative rotation of the connections and the plate is prevented.

9. An adjusting device for faucets, in combination with a sink-riser or backing having perforations through which the faucet connections extend, faucets adapted to engage said connections and rest against the backing, a plate having perforations through which the faucet connections extend, said plate adapted to bear against the connections, and an adjusting device connected with the plate and having a bearing against the backing, whereby said plate may be forced backward against the connections to draw the faucets against the face of the backing.

THOMAS QUINN.

Witnesses:
HENRY W. TITUS,
EDITH J. REMOND.